Aug. 29, 1967   J. T. CORNILLAUD   3,338,360
FLUID PRESSURE RESPONSIVE CLUTCH EXHAUST VALVE
Filed April 1, 1965

INVENTOR.
Jack T. Cornillaud
BY
Robert L. Spencer
ATTORNEY

United States Patent Office
3,338,360
Patented Aug. 29, 1967

3,338,360
FLUID PRESSURE RESPONSIVE CLUTCH
EXHAUST VALVE
Jack T. Cornillaud, Dearborn, Mich., assignor to General Motors Corporation, Detroit, Mich., a corporation of Delaware
Filed Apr. 1, 1965, Ser. No. 444,732
3 Claims. (Cl. 192—85)

This invention relates to clutch control valving and more particularly to such valving for use in connection with an engageable and releasable automatic transmission clutch.

In automatic transmissions it is common practice to provide a clutch adapted to be released to establish neutral or no drive operation and to be engaged to establish drive. In some transmissions the clutch may be engaged to establish forward drive only, and in others to establish either forward or reverse drive. The invention may be employed in either arrangement. Such clutches are commonly controlled by a manually operable selector valve adapted to be positioned to select forward, neutral or reverse operation.

In order to complete the exhaust of fluid from the cavity containing the clutch actuating piston, present practice is to provide a speed responsive ball check valve in the outer peripheral zone of the rotatable clutch housing. These valves are designed to be speed responsive and to open when the clutch cavity has been connected to exhaust by the manually operable control valve. The normal ball valve is opened by centrifugal force due to rotation of the clutch housing. Such centrifugal force responsive ball valves are not positive in their action and due to this impositive functioning contribute to clutch malfunction both during clutch engaging and clutch disengaging action. If the ball valve fails for any reason to open, fluid becomes trapped in the outer peripheral zone of the rotating housing. This fluid, due to its centrifugal force effect, will apply a thrust to the clutch piston tending to maintain the clutch engaged. This frequently results in failure of the clutch discs due to friction slipping contact causing the discs to burn. In the event that the discs are being engaged and the check valve fails to close for any reason, the clutch engaging pressure fails to rise at the proper rate and may result either in clutch damage due to clutch slippage or may result in clutch grab or jerk when the ball check valve closes at a time subsequent to that at which it is intended to close.

The improved clutch control valving disclosed herein provides for positive dump valve closing and opening action by making the valve pressure sensitive rather than speed sensitive as in common practice.

The improved clutch auxiliary exhaust valve is controlled by pressure supplied to the clutch servo piston to be biased by such pressure towards its cut off position. The arrangement is such that the valve presents different fluid pressure responsive areas to the pressure acting on the clutch piston and the pressure supplied to the valve such that a net hydraulic thrust is effective upon the valve biasing the valve towards its cut off position whenever clutch engaging pressure is delivered to the clutch servo to engage the clutch. The valve is provided with a chamber continuously connected to exhaust through a restricted passage to permit rapid release of valve closing pressure on the valve when clutch release is called for. The valve is then biased towards its open position by residual fluid in the clutch servo and moves in response to this fluid to connect the clutch servo to exhaust.

These and other features and advantages of this invention will be apparent from the following specification and claims taken in conjunction with the accompanying drawings, in which:

Figure 1:
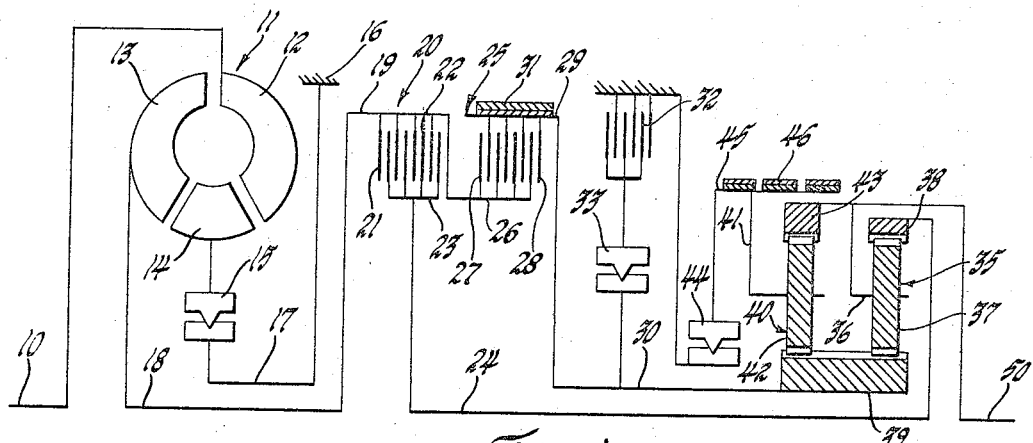
FIGURE 1 is a schematic diagram of a transmission incorporating the features of this invention.

Referring to FIGURE 1, there is shown one transmission of the type to which the present invention may be applied.

An engine driven power input shaft 10 drives an impeller 12 of a hydraulic torque converter indicated generally at 11. Converter 11 also includes a power delivery turbine 13 and a bladed reaction member 14. A one-way brake 15 prevents reverse rotation of reaction member 14 and permits forward rotation of the same. Brake 15 is grounded to the transmission case 16 through a ground sleeve shaft 17. A turbine driven shaft 18 drives a clutch drum 19 of a forward drive clutch 20. Drive clutch discs 21 are adapted to be engaged to driven clutch discs 22 on a driven clutch hub 23 to establish forward drive and to be released to establish neutral or no-drive operation. A power transfer shaft 24 is driven when clutch 20 is engaged.

A second clutch indicated generally at 25 includes a clutch drum 26 driven by clutch drum 19 and drives drive clutch discs 27. A driven clutch hub 29 carrying driven clutch discs 28 is connected to a pair of sun gears 39 by means of a shaft 30. Drum 19 may be braked against forward rotation by a brake band 31. Shaft 30 may be braked against reverse rotation by means of a disc brake 32 and a one-way brake 33 disposed in series relationship.

A planetary gearing system includes a first gear unit 35 having a planet carrier 36 supporting a planet pinion 37 in mesh with a ring gear 38 and sun gear 39 and a second planetary gearing unit 40 having a planet carrier 41 supporting a planet pinion gear 42 in mesh with a ring gear 43 and sun gear 39. Planet carrier 36 is fixed for rotation as a unit with ring gear 43 and a final power delivery shaft 50. A one-way brake 44 prevents reverse rotation of a drum 45 fixed for rotation with carrier 41 and permits forward rotation of the same. An over-run brake 46 may be applied to drum 45 to prevent forward rotation of the drum and carrier 41 for over-run braking purposes and is also applied to establish reverse drive.

The planetary gearing system may be controlled to provide three forward drive ratios, neutral, and reverse.

For neutral, all brakes and clutches are released. Forward drive drum 19 and direct drive clutch hub 26 may be driven by converter 11, but with clutches 20 and 25 released the transmission will not drive the output shaft 50.

For first gear forward drive, clutch 20 and over-run brake 46 are engaged. Power input is through clutch 20 and shaft 24 to ring gear 38. Reduction drive is through both gear units including sun gear 39 to pinion 42 to ring gear 43. Planet carrier 36 rotates forwardly at the speed of rotation of shaft 50. Brake 44 prevents reverse rotation of carrier 41. Over-run brake 46 may be applied to prevent forward rotation of carrier 41.

For second speed drive, clutch 20 is engaged, brakes 31 and 32 are engaged and brake 46 is released. One-way brake 33 prevents reverse rotation of sun gear 39 and over-run brake 31 prevents forward rotation of sun gear 39. Drive is at the reduction ratio of gear unit 35.

For direct drive, clutches 20 and 25 are engaged and brakes 31 and 46 released. Power input is to ring gear 38 through clutch 20 and to sun gear 39 through clutch 25 for direct drive.

For reverse drive, clutch 20 is released, clutch 25 engaged and brake 47 applied to drum 46. Drive is through sun gear 39 to pinion gear 42 to ring gear 43.

Figure 2:
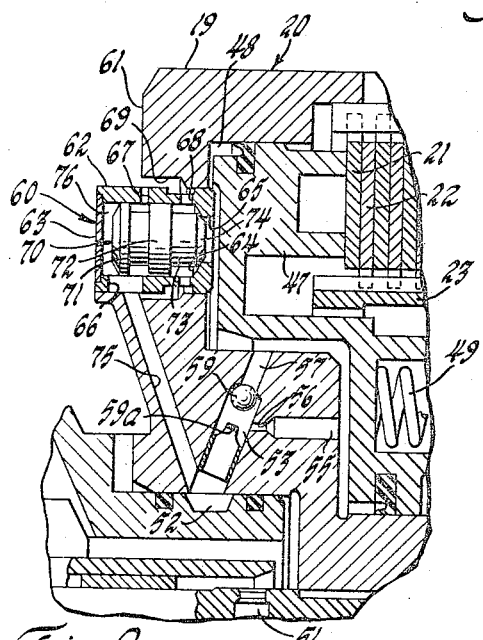
FIGURE 2 is a longitudinal sectional view through a portion of one of the clutch servos for actuating one of the clutches of FIGURE 1 particularly illustrating the improved auxiliary clutch servo dump valve features of a first dump valve structure.
Figure 3:
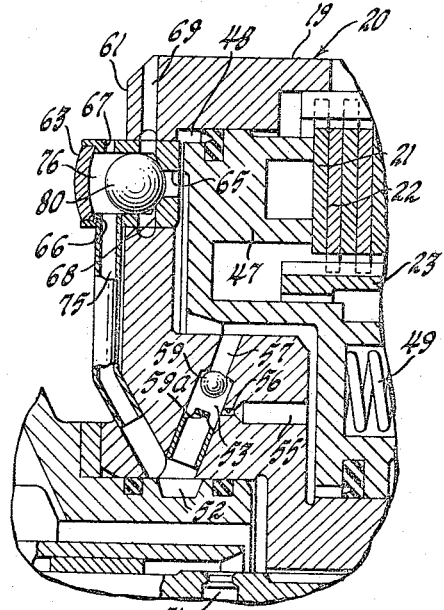
FIGURE 3 is a longitudinal sectional view through a portion of one of the clutch servos illustrating a modified auxiliary dump valve structure.

The improvement comprising this invention is shown in FIGURES 2 and 3, where parts corresponding to FIGURE 1 are given the same reference numerals as in FIGURE 1.

Referring to FIGURE 2 there is shown a portion of clutch 20 of FIGURE 1 including the clutch drum 19, drive plates 21, driven plates 22, and clutch hub 23. A clutch apply piston or servo 47 forms with drum 19 a chamber 48 adapted to receive fluid under pressure. A clutch release spring 49 biases piston 47 towards its clutch release position. Fluid under pressure may be admitted to chamber 48 through a passage 51, an annular recess 52, passage 53 and a branch passage 55 through a restriction 56. A pressure exhaust passage 57 is blocked off by a ball valve 59 when pressure is supplied to chamber 48. When passage 51 is connected to exhaust, ball valve 59 is moved against a stop member 59a to permit exhaust of fluid through the unrestricted branch passage 57 as well as through restricted passage 55. The ball valve 59 and restriction 56 restrict the rate of pressure build-up in chamber 48 for smooth clutch engagement and provide for fast unrestricted exhaust of pressure from the chamber 48 for rapid clutch release.

It is to be noted that the structure heretofore described for controlling the rate of admission to and exhaust of pressure from chamber 48 is positioned in the radially inner zone of the plane of rotation of clutch drum 19 and the parts therein. In the event that it is desired to release the clutch at relatively low speeds of rotation of drum 19, this arrangement performs satisfactorily. However, a relatively high speeds of rotation of drum 19, it will be apparent that some residual oil will remain in chamber 48. At relatively high speeds of rotation of the clutch elements this residual liquid in chamber 48 develops a pressure on the piston or movable wall 47 due to centrifugal force which may prevent complete release of the clutch, causing burning of the clutch discs or may even cause undesired clutch engagement.

To improve clutch operation, an auxiliary dump valve indicated generally at 60 is provided in the outer radial zone of the plane of rotation of the rotating parts. A side wall 61 of drum 19 is drilled axially to provide a recess adapted to receive a sleeve or valve body 62. A cover 63 blocks off one end of the valve body. Valve body 62 is shaped to provide a valve seat 64, forms a passage 65 open to chamber 48, and is provided with ports 66, 67 and 68. A space or passage 69 extends axially between valve body 62 and wall 61 of clutch drum 19. Valve body 62 is positioned in an axial direction perpendicular to the plane of rotation of drum 19. A valve 70 axially movable with respect to valve body 62 is provided with spaced lands 71 and 72 of equal diameter and with a stem 73 of lesser diameter having a conical end 74 adapted to contact valve seat 64. A branch passage 75 connects recess 52 to a chamber 76 at the end of land 71. Port 66 is a relatively wide port and port 67 is essentially a restriction.

In operation, it will be apparent that when pressure is supplied to chamber 48 to engage the clutch through passage 53, this clutch apply pressure will also be delivered to passage 75 which is hydraulically in parallel relation to passage 53. Pressure from passage 75 in chamber 76 acting upon land 71 will bias valve 70 to its closed position. Pressure in chamber 48 acting on the end of stem 73 will bias valve 70 towards its open position. However, since land 71 is of greater diameter than stem 73, valve 70 will remain closed. It will be noted that port 67, in the closed position of valve 70 is connected to port 66 by the space between lands 71 and 72. The restricted port 67 therefore cooperates with wide port 66 to connect chamber 76 and passage 75 to exhaust. It will be understood that where clutch engagement is called for, fluid is continuously being supplied to passage 75 and chamber 76. The leakage provided by port 67 will not effect operation of valve 70 so long as pressure is being supplied to passage 75. However, when passage 75 is connected to exhaust for clutch release, port 67 permits a very rapid drop of pressure in passage 75 and chamber 76. Residual oil in chamber 48 is thereupon effective to move valve 70 to the left as viewed in the figure to exhaust residual oil from chamber 48 through passage 65 and exhaust port 68 and passage 69.

In FIGURE 3 there is shown a modified valve 80 which functions in the same manner as valve 70 of FIGURE 2. Parts similar to FIGURE 2 are given the same numerals as FIGURE 2. In FIGURE 3 a ball valve 80 replaces valve 70 of FIGURE 2 and exhaust passage 69 is drilled radially in housing 19 rather than axially as in FIGURE 2. Restriction 67 again provides a restricted continuous leakage of fluid from chamber 76. It will again be noted that the area subjected to pressure in chamber 76 is greater than the area of ball subjected to pressure from chamber 48 such that ball 80 will close off exhaust port 69 when the pressures are the same and will maintain the ball valve closed until the pressure in chamber 76 drops below that in chamber 48. It will be noted that both valves 70 and 80 travel axially in their valve bodies such that centrifugal force will not unseat the valves. The valves are controlled solely by the pressure in chambers 76 and 48 acting on the differential area of the valves subjected to this pressure.

Figure 4:
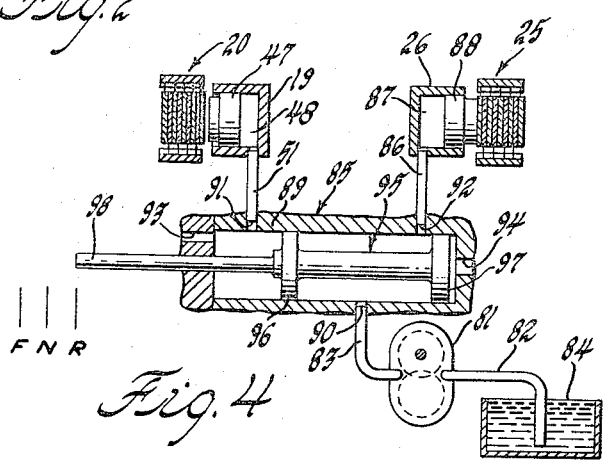
FIGURE 4 is a schematic view of a manual valve adapted to be positioned to either direct fluid pressure to the clutch servo and to the clutch servo auxiliary exhaust valve or to connect them both to exhaust.

In FIGURE 4 there is shown a schematic diagram of a valve arrangement which may be used to control the admission of pressure to clutch 20 for forward drive and to clutch 25 for establishing reverse drive. A pump 81 may draw fluid from a transmission sump 84 through a passage 82 and deliver the same under pressure to a passage 83. A manually operable valve 85 may be positioned to deliver pressure to chamber 48 of clutch 20 through passage 51 or to a chamber 87 to a clutch apply piston 88 through a passage 86. Valve 85 includes a valve body 89 having ports 90 through 94. A movable valve member 95 is provided with spaced lands 96, 97 and a stem 98. With the valve positioned for forward drive, pressure will be admitted to passage 51 through ports 90, 91 and passage 86 will be connected to exhaust through ports 92, 94. With the valve positioned for reverse drive, pressure will be admitted to passage 86 through ports 90, 92 and passage 51 will be connected to exhaust through ports 91, 93.

While the specific auxiliary dump valves 70 and 80 of FIGURES 2 and 3 have been illustrated as being applied solely to forward drive clutch 20, it will readily be understood that they may be used in connection with clutch 25 or any clutch desired. The valves herein described are uneffected in their operation by centrifugal force, rely on pressure for actuation and provide an improved positive action which prevents clutch drag or objectionable clutch engagement due to the centrifugal force effect of residual oil in the clutch servo chamber. While the clutch servo is shown as comprising a piston, it will be understood that any movable wall such as a diaphragm, for example, may be substituted for the piston.

I claim:

1. In a hydraulically actuated clutch, a rotatable housing, clutch elements adapted to be engaged and released disposed in said housing, a chamber in said housing adapted to receive fluid under pressure, fluid pressure responsive means in said chamber for engaging said clutch elements in response to fluid pressure supplied to said chamber, a fluid pressure source, a valve body carried by said housing and disposed adjacent said chamber, a valve in said valve body axially movable with respect to said valve body, a first exhaust port in said valve body adapted to be controlled by said valve, a second restricted exhaust port in said valve body, said valve being responsive to fluid pressure in said chamber to connect said chamber to exhaust through said first exhaust port, means forming a second chamber in said valve body adapted to receive fluid under pressure, a fluid pressure source, passage means connecting both of said chambers to said source, valve means for alternately connecting said chambers to said source through said passage means or to connect both of said chambers to exhaust through said passage means, said valve being movable in response to fluid pressure to block off said first mentioned chamber from said first exhaust port upon admission of pressure to said passage means while permitting restricted fluid flow through said second restricted exhaust port, said valve being movable by pressure in said first chamber to connect said first chamber to exhaust through said first exhaust port when said passage means is connected to exhaust.

2. In a hydraulically controlled clutch, a rotatable housing, engageable and releasable friction elements in said housing, fluid pressure responsive means for engaging and releasing said friction elements forming with said housing a first rotatable chamber adapted to receive fluid under pressure, a pressure relief passage for relieving fluid pressure from the outer radial zone of said chamber, a valve seat in said relief passage, a movable valve member in said relief passage effective in a first position to contact said valve seat to block off said relief passage and effective in a second position to open said relief passage to permit exhaust of fluid from said chamber through said relief passage, first fluid pressure responsive means responsive to pressure in said chamber to bias said valve towards said second position, means forming a second chamber adapted to receive fluid under pressure, second fluid pressure responsive means responsive to pressure in said second chamber to bias said valve toward said first position irrespective of pressure in said first chamber, the area of the fluid pressure responsive means responsive to pressure in said second chamber being greater than the area of the fluid pressure responsive means which is responsive to pressure in said first chamber, a fluid pressure source, passage means for conducting pressure from said source to both of said chambers, a valve effective in one position to direct pressure to said last-mentioned passage means and effective in a second position to connect said passage means to exhaust, and a restricted exhaust port in said second chamber for permitting exhaust of fluid from said second chamber irrespective of the position of said last-mentioned valve.

3. In a hydraulically controlled clutch, a rotatable housing, engageable and releasable clutch elements in said housing, a fluid pressure responsive piston in said housing for engaging and releasing said clutch elements, said piston forming with said housing a first chamber adapted to receive fluid under pressure, a pressure relief passage for relieving fluid from said chamber, a valve seat in said passage, said passage extending perpendicular to the plane of rotation of said housing, a valve member in said relief passage axially movable in said relief passage for contacting said seat to block off said first chamber and movable to a position to permit exhaust of fluid from said first chamber through said relief passage, a surface on said valve responsive to pressure in said first chamber to bias said valve into spaced relationship with said valve seat, means forming a second chamber adapted to receive fluid under pressure, a second fluid pressure responsive surface on said valve member responsive to fluid in said second chamber for biasing said valve member into contact with said valve seat, the area of the surface of said valve member responsive to pressure in said second chamber being greater than the area of the surface of the valve member acted upon by pressure in said first chamber when said valve is in contact with said valve seat, a restricted exhaust port in said second chamber for permitting restricted exhaust of fluid from said second chamber, a fluid pressure source, passage means for conducting fluid from said source to both of said chambers, and additional valve means for directing pressure and to both of said chambers through said passage means for connecting both of said chambers to exhaust through said passage means.

References Cited
UNITED STATES PATENTS

| | | | |
|---|---|---|---|
| 2,583,919 | 1/1952 | Wilson | 192—85 |
| 2,864,479 | 12/1958 | Schindler | 192—85 |
| 3,176,813 | 4/1965 | Lee et al. | 192—85 |

BENJAMIN W. WYCHE III, *Primary Examiner.*

UNITED STATES PATENT OFFICE

CERTIFICATE OF CORRECTION

Patent No. 3,338,360                                      August 29, 1967

Jack T. Cornillaud

It is hereby certified that error appears in the above numbered patent requiring correction and that the said Letters Patent should read as corrected below.

Column 6, line 34, strike out "and", second occurrence; line 35, after "means" insert -- and --.

Signed and sealed this 20th day of August 1968.

(SEAL)
Attest:

Edward M. Fletcher, Jr.                                    EDWARD J. BRENNER
Attesting Officer                                              Commissioner of Patents